US 6,564,705 B2

(12) United States Patent  (10) Patent No.: US 6,564,705 B2
Zarlengo                   (45) Date of Patent:     May 20, 2003

(54) MANUALLY OPERATED MULTI-FUNCTION FOOD PROCESSING, PREPARATION AND JUICING UNIT

(75) Inventor: Vincent Zarlengo, Sylmar, CA (US)

(73) Assignee: Thane International, Inc., La Quinta, CA (US)

( * ) Notice: Subject to any disclaimer, the term of this patent is extended or adjusted under 35 U.S.C. 154(b) by 0 days.

(21) Appl. No.: 09/833,872

(22) Filed: Apr. 12, 2001

(65) Prior Publication Data

US 2001/0047726 A1 Dec. 6, 2001

Related U.S. Application Data

(60) Provisional application No. 60/274,183, filed on Mar. 9, 2001, provisional application No. 60/274,184, filed on Mar. 9, 2001, and provisional application No. 60/196,380, filed on Apr. 12, 2000.

(51) Int. Cl.[7] ................................................. B30B 1/22
(52) U.S. Cl. ........................ 100/288; 100/245; 100/283; 99/508; 83/932
(58) Field of Search .......................... 99/495, 506, 508, 99/507; 100/98 R, 245, 283, 288, 902; 83/425.3, 437.1, 437.5, 437.6, 858, 932

(56) References Cited

U.S. PATENT DOCUMENTS

| 752,884 A | 2/1904 | Carmichael |
|---|---|---|
| 783,300 A | 2/1905 | McGrath |
| 789,623 A | 5/1905 | McGrath |
| 1,038,543 A | 9/1912 | Eames |
| 1,867,657 A | 7/1932 | Dellinger |
| 1,947,153 A | 2/1934 | Dellinger |
| 2,245,978 A | 6/1941 | Hyland |
| 2,507,963 A | 5/1950 | Davitcho |
| 2,509,190 A | 5/1950 | Langley |
| 2,553,942 A | * 5/1951 | Roos ............................ 100/288 |
| 2,693,210 A | 11/1954 | Gustafson |
| 2,697,980 A | * 12/1954 | Johnson ...................... 100/288 |
| 2,703,522 A | 3/1955 | Smith |
| 4,345,519 A | 8/1982 | Sabino |
| 5,188,024 A | 2/1993 | Li |
| 5,245,902 A | 9/1993 | Pereira |
| 5,520,105 A | 5/1996 | Healy |
| 6,318,252 B1 | * 11/2001 | Kao ............................ 100/283 |

FOREIGN PATENT DOCUMENTS

FR          1144139      * 10/1957   .................. 100/288

* cited by examiner

*Primary Examiner*—W. Donald Bray
(74) *Attorney, Agent, or Firm*—Kelly Bauersfeld Lowry & Kelley, LLP

(57) ABSTRACT

A multi-functional food processing, preparation and juicing unit includes an elongated hollow post fixed to a base and extending vertically therefrom. A pressure assembly is movably mounted to the post and configured to removably accept an upper processing adapter having a predetermined surface configuration. The pressure assembly includes a rack residing within the post and having a plurality of teeth. A rotatable crank assembly includes a gear extending into the post which engages the teeth of the rack for raising and lowering the pressure assembly by rotating a handle operably engaged with the gear. A holder is fixed to an upper end of the base, and is configured to releasably accept a lower processing adapter having a surface configuration which substantially mates with the surface configuration of the upper processing adapter to perform a predetermined food processing function when the upper processing adapter is brought towards the lower processing adapter.

24 Claims, 5 Drawing Sheets

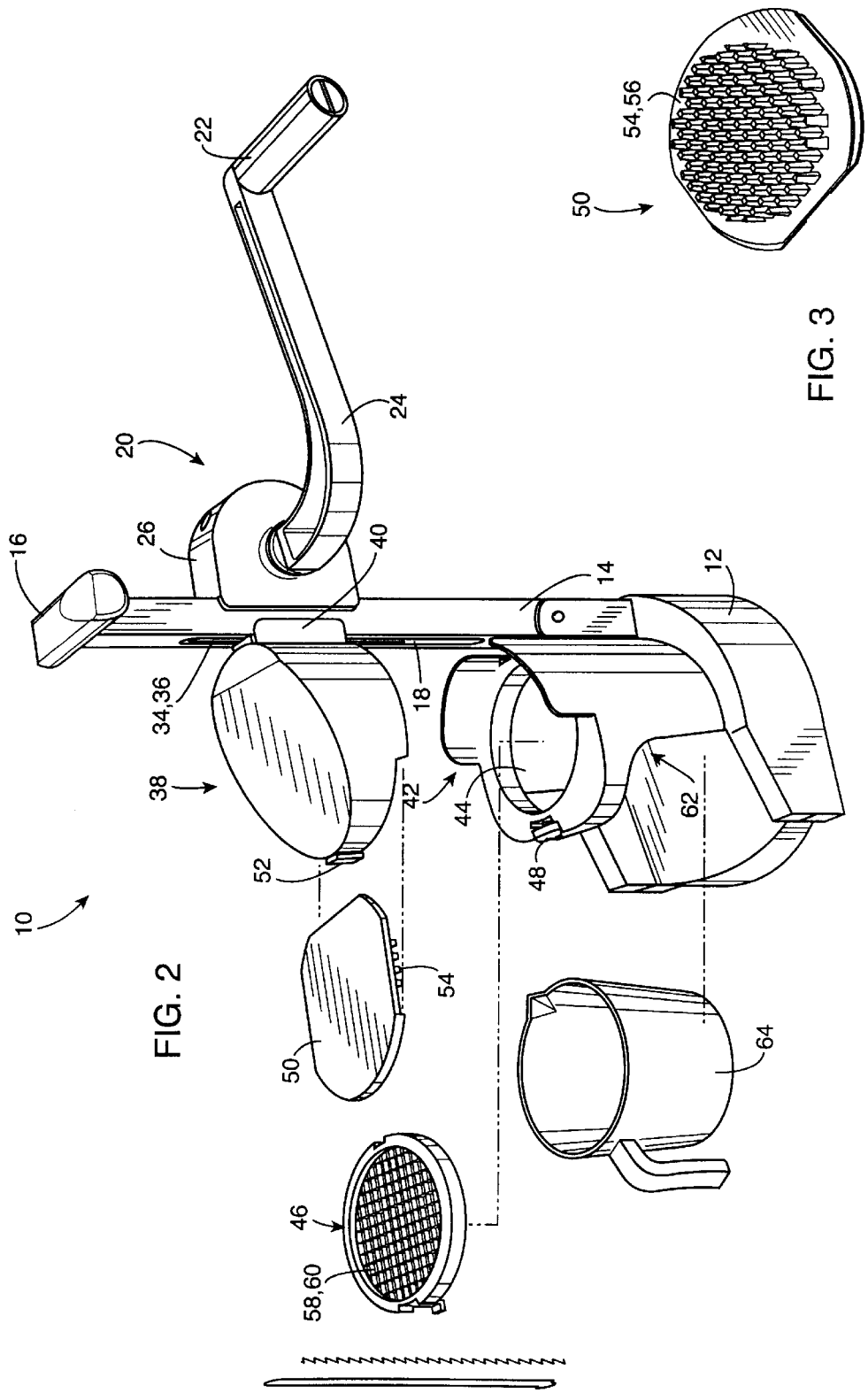

MANUALLY OPERATED MULTI-FUNCTION FOOD PROCESSING, PREPARATION AND JUICING UNIT

RELATED APPLICATION

This application claims priority from U.S. Provisional Application Ser. No. 60/196,380 filed Apr. 12, 2000 and U.S. Provisional Application Ser. No. 60/274,184, filed on Mar. 9, 2001, and Provisional Application Ser. No. 60/274,183 filed on Mar. 9, 2001.

BACKGROUND OF THE INVENTION

The present invention generally relates to kitchen and culinary devices. More particularly, the present invention relates to a manually operated multi-function food processing, preparation and juicing unit.

There exist many hand operated devices for juicing, cutting fruit into segments, and cutting vegetables into a desired size and shape. However, these devices often require a substantial amount of exertion and force to perform their intended function. The use of these devices can be quite taxing to the ordinary users of such devices. Another disadvantage of such devices is the need for a device for each operation. For example, there must be stored a juicer, a wedger or segmenter, and perhaps several cutting implements for vegetables.

There also exists various automated devices. Although these devices also include interchangeable components, allowing the user to perform more than one function with the device, they are rather large in size as well as expensive, and don't always perform all the intended tasks adequately, or do not perform certain functions at all.

Accordingly, there is a need for a multi-functional unit which is capable of food processing, preparation and juicing. Such a unit should be relatively easy to operate so as not to require undue exertion on behalf of the user. Such a unit should also be capable of being re-configurable so as to perform a variety of tasks. The present invention fulfills these needs and provides other related advantages.

SUMMARY OF THE INVENTION

The present invention resides in a multi-functional food processing, preparation and juicing unit. The multi-functional unit generally comprises an elongated hollow post fixed to a base and extending vertically therefrom. A holder is fixed to an upper end of the base adjacent to the post. A pressure assembly is movably mounted to the post above the holder. The pressure assembly includes a rack residing within the post and having a plurality of teeth disposed within the hollow post. A rotatable crank assembly includes a gear extending into the hollow post which engages the teeth of the rack, for raising and lowering the pressure assembly. The crank assembly is typically fixed in place on the post.

Preferably, the post includes one or more slots through which the pressure assembly connects to the rack. The rotatable crank assembly includes a handle operably engaged with a gear such that when the handle is rotated, the gear rotates causing the rack, and thus the pressure assembly, to move along the post.

The holder defines an aperture through which food processed by the multi-functional unit passes. Preferably, the holder and base cooperatively define a cavity into which a container may be removably placed for the capture of the processed food.

The pressure assembly is configured such so as to removably accept an upper processing adapter having a predetermined surface configuration. The holder is likewise configured to accept a lower processing adapter having a surface configuration which substantially mates with the surface configuration of the upper processing adapter to perform a predetermined function, such as cutting or juicing, when the upper processing adapter is brought towards the lower processing adapter. The lower processing adapter is releasably attached to the holder so that it can be mated with the appropriate upper processing adapter to perform the intended food processing function.

The multi-functional unit may include means for locking the unit onto a flat surface, such as a vacuum lock mechanism associated with the base.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings:

FIG. 2 is a partially exploded perspective view of the multi-functional unit of FIG. 1;

FIG. 3 is a perspective view of an exemplary upper processing adapter used in accordance with the present invention;

DETAILED DESCRIPTION OF THE PREFERRED EMBODIMENT

As shown in the accompanying drawings for purposes of illustration, the present invention resides in a multi-functional unit, generally referred to by the reference number 10, that is capable of being manually actuated to process and prepare food, serve as a juicer, etc.

Figure 1:
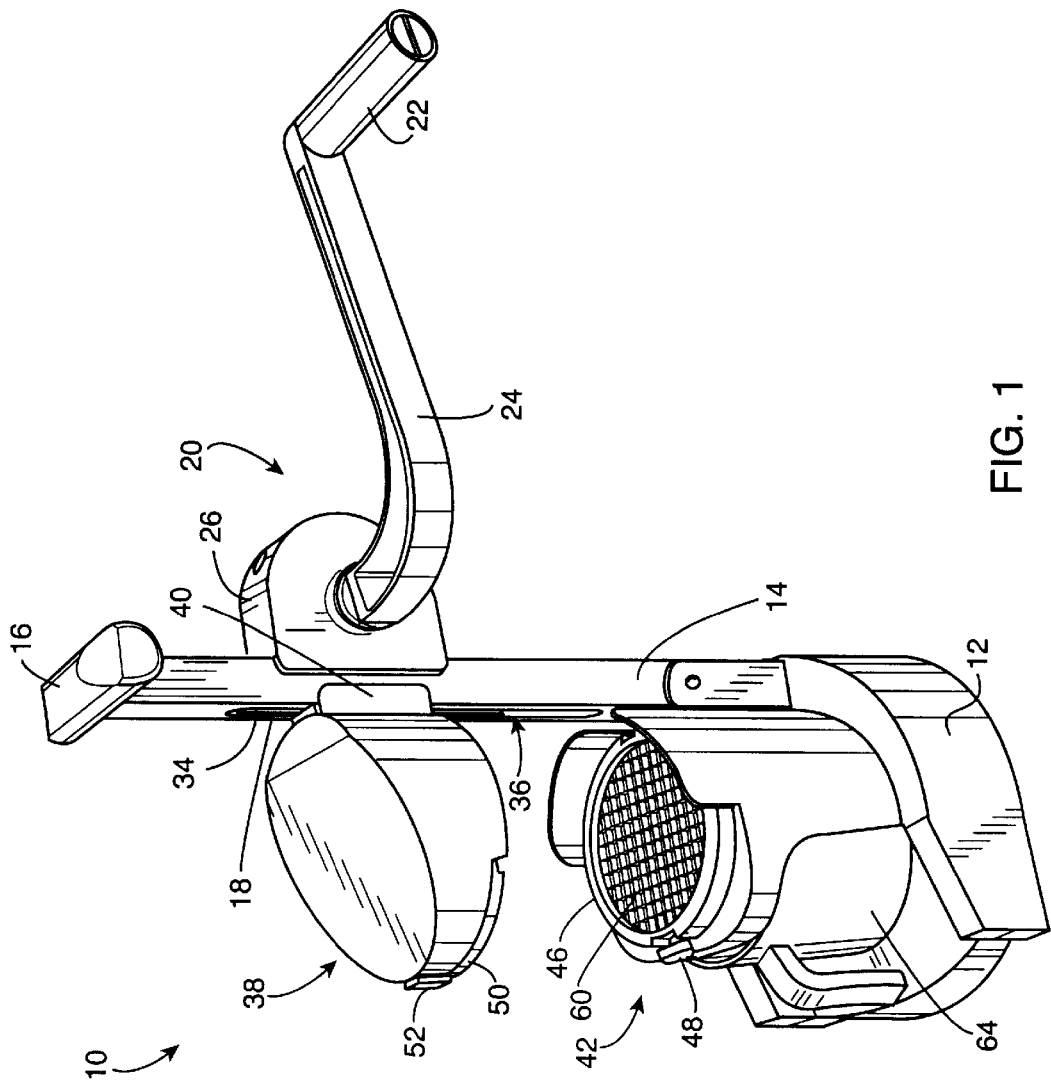
FIG. 1 is a perspective view of a multi-functional food processing, preparation and juicing unit embodying the present invention.

With reference to FIG. 1, the multi-functional unit 10 includes a base 12 which serves to stabilize the unit 10. A post 14 is fixed to the base 12 and extends vertically upward therefrom. The post 14 is hollow and typically comprised of metal or other durable material. Preferably, the post 14 includes a hand grip 16 attached to an end thereof opposite the base 12 which can be grasped by a user of the multi-functional unit 10 during operation of the unit 10 and also serve to stabilize the multi-functional unit 10 when in use.

At least one slot 18 is formed through a surface of the post 14, which purpose will be further discussed herein.

Figure 7:
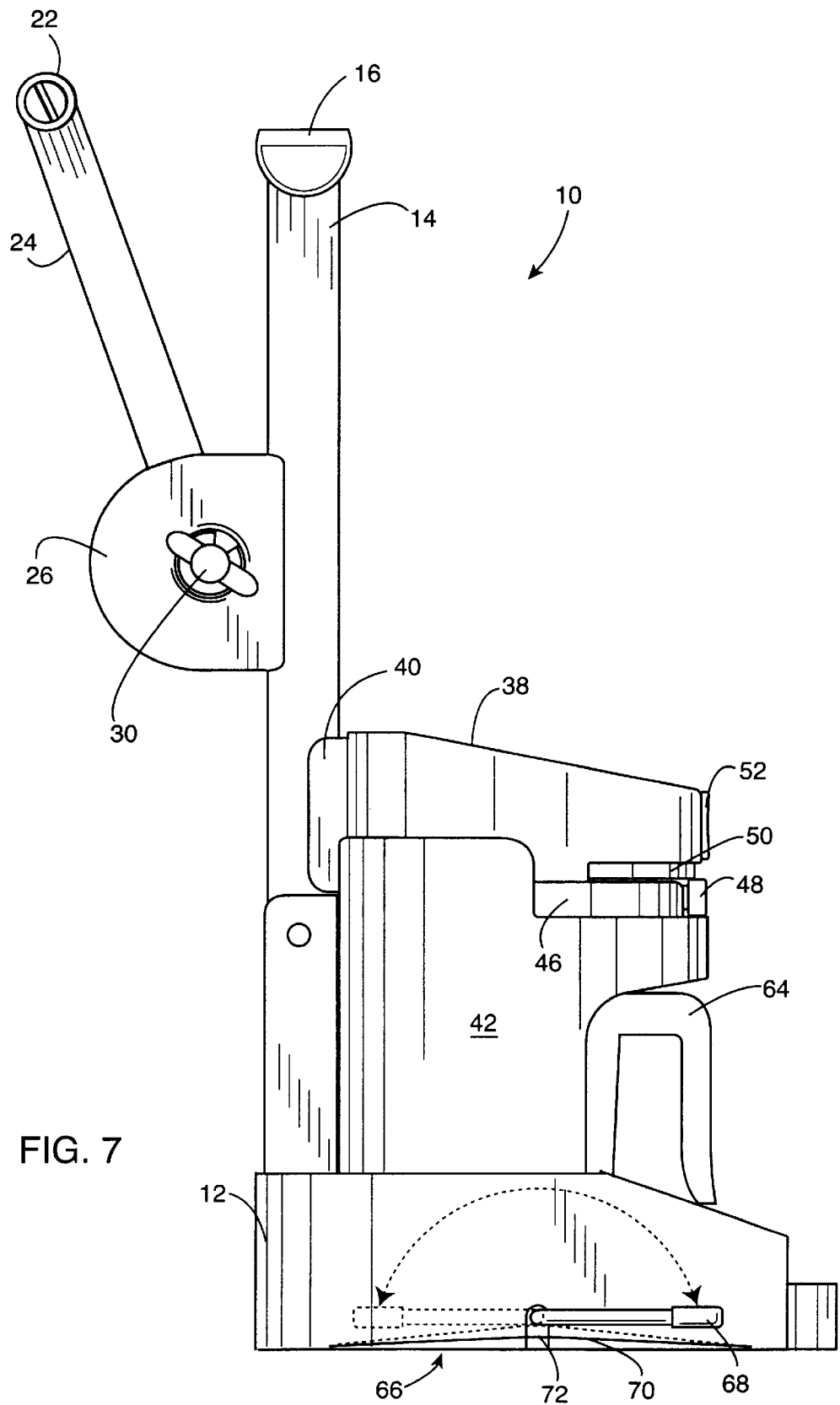
FIG. 7 is a side elevational view of the multi-functional unit embodying the present invention, illustrating actuation of a lever to releasably lock the multi-functional unit onto a flat surface.

A rotatable crank assembly 20 is connected to the post 14. The crank assembly 20 includes a handle 22 connected to a first end of a crank arm 24. With reference to FIGS. 1 and 7, the second end of the crank arm 24 is insertable into a housing 26 which surrounds a gear 28 of the crank arm assembly 20. A wing nut 30 or the like holds the crank arm 24 in place so that it is operably engaged with the gear 28. The crank arm 24 can be disengaged from the gear 28 and removed from the multi-functional unit 10 by loosening wing nut 30 and sliding the second end of the crank arm 24 from its engagement with the gear 28. Such disengagement may be desirable when the multi-functional unit 10 is to be stored in a compact space.

Figure 5:
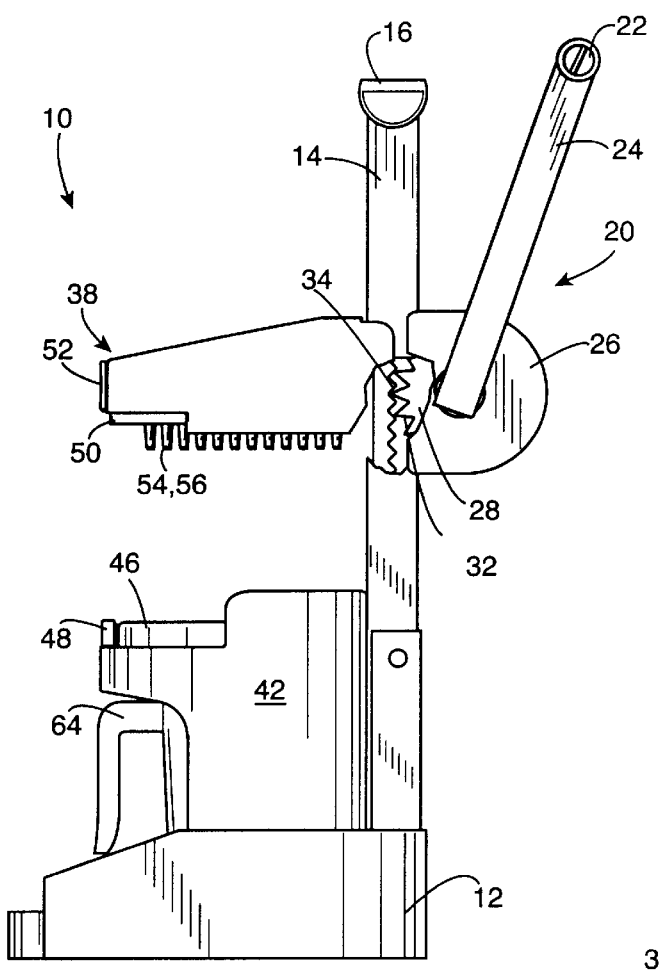
FIG. 5 is a partially fragmented side elevational view, illustrating a gear of a rotatable crank assembly engaged with teeth of a rack of the pressure assembly positioned at an elevated position.
Figure 6:
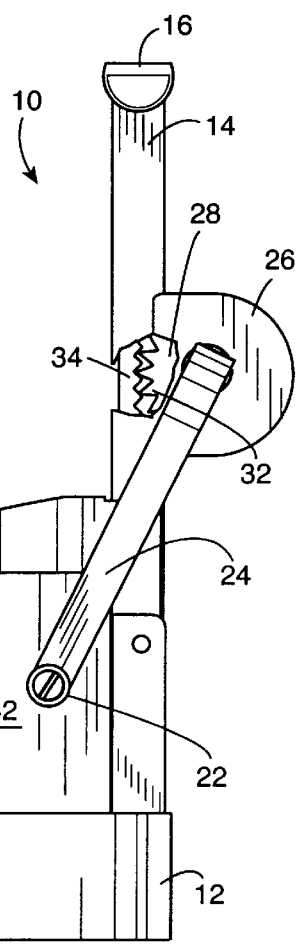
FIG. 6 is a partially fragmented perspective view similar to FIG. 5, wherein a handle of the rotatable crank assembly has been rotated to move the pressure assembly into contact with the holder.

With reference to FIGS. 5 and 6, the gear 28 has cogs 32 which engage teeth 34 of a rack 36 residing within the hollow post 14. The rack 36 is connected to a pressure assembly 38 through the one or more slots 18. Although the drawings illustrate a single slot 18 formed in a front face of the post 14, it should be understood that there may be other configurations, such as opposing slots formed in the sides of the post 14 which could serve the same purpose. As the gear 28 of the crank arm assembly 20 is rotated by rotating handle 22 and crank arm 24, the rack 36 is moved upwardly or downwardly within the post 14, causing the pressure assembly 38 to similarly move along the length of the post 14. Crank assembly 20 is preferably fixed in place on the post 14. Typically, the pressure assembly 38 is connected to the rack 38 directly or by means of a bracket 40 or ears attached to or extending from the pressure assembly 38 at one end thereof for connection to the rack 36, particularly when the slots 18 are formed in opposing sides of the post 14. Thus, the pressure assembly 38 is capable of moving along the post 14 throughout the length of the slot 18.

Referring to FIGS. 1 and 2, a holder 42 is immovably attached or otherwise fixed to an upper surface of the base 12. The holder 42 defines an aperture 44 through which processed food, juice, etc. can pass through. The holder 42 is configured such that a lower processing adapter 46 can be placed over aperture 44. Typically, the lower processing adapter 46 is releasably attached to a top of the holder over the aperture 44 and held in place with a lock 48.

Similarly, the pressure assembly 38 is configured such that an upper processing adapter 50 is attached to a bottom surface thereof. Typically, the upper processing adapter 50 is inserted into an adapter-accepting groove and cavity formed at the bottom surface of the pressure assembly 38. The upper processing adapter 50 is held in place with lock 52. In this manner, the upper processing adapter 50 is held securely in place until lock 52 is manually actuated to release the upper processing adapter 50.

With reference to FIGS. 2 and 3, the upper processing adapter 50 has a predetermined surface configuration 54 which is intended to facilitate the food processing or juicing function desired. As illustrated in FIG. 3, the upper processing adapter 50 includes multiple square projections 56 rising from the upper processing adapter 50. The lower processing adapter 46 includes a surface configuration 58 which cooperates and mates with the upper processing adapter surface configuration 54 to bring about the desired function. As illustrated in FIG. 2, the lower processing adapter surface processing configuration 58 comprises a grid of wires or cutting blades 60 forming apertures which substantially mate with the square projections 56 of the upper processing adapter 50. Thus, when a potato, vegetable or the like is placed on the lower processing adapter 46, and the pressure assembly 38 brought towards the holder 42 by rotating handle 22, the potato, vegetable, or the like is cut into french fry or shoe string-like pieces. The holder 42 is configured such that pressure assembly 38 can be brought towards the holder 42 until upper processing adapter 50 actually contacts or even passes through the lower processing adapter 46.

It will be appreciated by the reader that the surface processing configurations 54 and 58 can be varied such that the vegetable is cut into different shapes, a piece of fruit is cored and cut into wedge-shaped segments, or citrus or the like is pressed to remove the juice therefrom. The multi-functional unit 10 can accomplish all of these various food processing and juicing functions by replacing the upper and lower processing adapters 50 and 46 to initiate the desired function.

Figure 4:
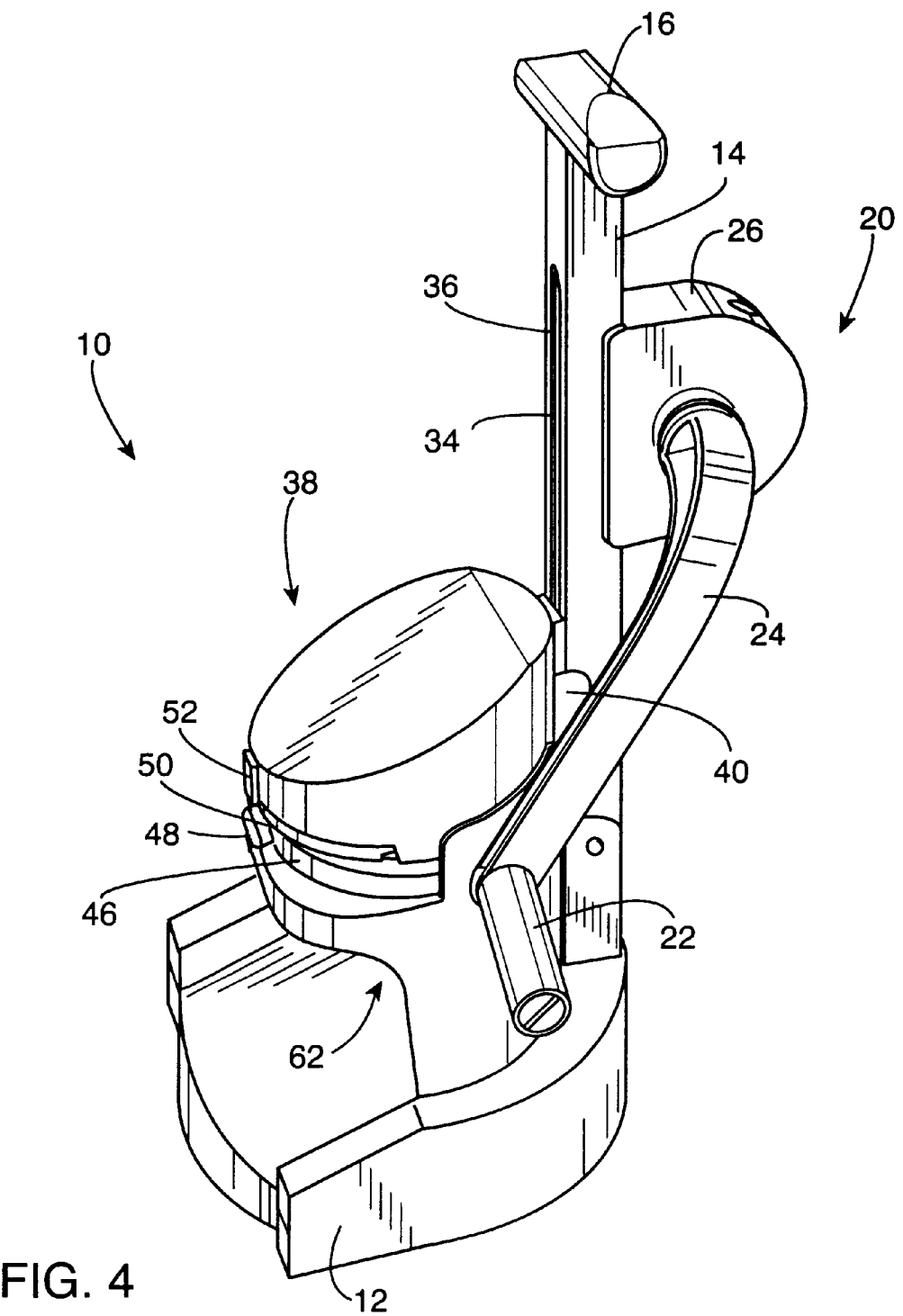
FIG. 4 is another perspective view of the multi-functional unit, illustrating a pressure assembly thereof moved into engagement with a holder thereof.

With the intended upper and lower processing adapters 46 and 50 in place on the holder 42 and pressure assembly 38, respectively, the intended food processing function is performed by rotating handle 22, causing gear 28 to rotate and move rack 36, and thus the upper processing adapter 50 positioned in the pressure assembly 38, downwardly towards the lower processing adapter 46 positioned on holder 42, as illustrated in FIG. 4. The desired cutting, juicing, etc. is thus performed.

With reference to FIGS. 1 and 2, the holder 42 is configured such with relation to the base 12 so as to form a cavity 62 therebetween. This cavity 62 is intended for capture and transfer of the processed food or juice which has been forced through aperture 44. Preferably, the cavity 62 is dimensioned such that a container 64 can be placed thereunder to capture the processed food or juice. The container 64 can be placed within the cavity 62, or even be locked therein so as to prevent the container 64 from inadvertently moving out of position during operation of the multi-functional unit 10.

With reference now to FIG. 7, the multi-functional unit 10 may include a locking mechanism for selectively locking the unit 10 onto a flat surface. As illustrated in FIG. 7, this locking mechanism preferably comprises a vacuum lock mechanism 66 associated with the base 12. The vacuum lock mechanism 66 includes a lever 68 attached to a generally circular membrane 70 attached at its periphery to a bottom surface of the base 12. The lever 68 extends out an aperture 72 of the base 12 and is pivotable between a released state wherein the membrane 70 is in a relaxed and generally flat configuration, and a locked state wherein the lever 68 upon pivoting moves the membrane 70 upward into a generally convex configuration, creating a vacuum seal between the base 12 and flat surface underlying the base 12 so that the base 12 is suctioned securely onto the flat surface. Such a locking mechanism 66 is advantageous in that the multi-functional unit 10 can be placed upon a table, countertop, etc. having a flat and smooth surface and locked in place thereon by pivoting lever 68.

With the multi-functional unit 10 immobile, food is more easily processed, juice extracted, etc. without fear that the multi-functional unit 10 will topple or otherwise become unstable during the manual rotation of the handle 22. This also frees the hands of the user so that one hand can hold onto the fruit or vegetable positioned between the pressure assembly 38 and holder 42 until the handle 22 is rotated such that the pressure assembly 38 applies sufficient pressure to the vegetable or fruit that it no longer needs to be held in place. The user can then grasp hand grip 16 while continuing to rotate handle 22 to complete the desired food processing function. Such a vacuum lock mechanism 66 is preferred over other locking mechanisms, although such can be incorporated into the invention, as it does not require the proper positioning on a ledge, adjustment of parts, etc. that such locking mechanisms require.

However, the unit can be designed such that the locking mechanism 66 can be removed, so that processed food can fall directly through the holder 42 and onto the counter or cutting board or other working surface.

Although an embodiment has been described in detail for purposes of illustration, various modifications may be made without departing from the scope and spirit of the invention. Accordingly, the invention is not to be limited, except as by the appended claims.

What is claimed is:

1. A multi-functional food processing, preparation and juicing unit, comprising:
   a base;
   an elongated hollow post fixed to the base and extending vertically therefrom;
   a holder fixed to an upper end of the base adjacent to the post, wherein the holder defines an aperture through which food processed by the multi-functional unit passes, and wherein the holder and base cooperatively define a cavity into which a container may be removably placed for the capture of processed food;
   a pressure assembly movably mounted to the post above the holder, the pressure assembly including a rack residing within the post and having a plurality of teeth; and
   a rotatable crank assembly fixed to the post and including a gear extending into the post which engages the teeth of the rack for raising and lowering the pressure assembly.

2. The multi-functional unit of claim 1, wherein the post includes a slot through which the pressure assembly connects to the rack.

3. The multi-functional unit of claim 2, wherein the rotatable crank assembly includes a handle operably engaged with the gear such that when the handle is rotated, the gear rotates causing the rack to move parallel to the post.

4. The multi-functional unit of claim 1, wherein the pressure assembly is configured to accept an upper processing adapter having a predetermined surface configuration.

5. The multi-functional unit of claim 4, wherein the upper processing adapter is removably attached to the pressure assembly.

6. The multi-functional unit of claim 4, wherein the holder is configured to accept a lower processing adapter having a surface configuration which substantially mates with the surface configuration of the upper processing adapter to perform a predetermined function when the upper processing adapter is brought towards the lower processing adapter.

7. The multi-functional unit of claim 6, wherein the lower processing adapter is releasably attached to the holder.

8. The multi-functional unit of claim 1, including means for locking the multi-functional unit onto a flat surface.

9. The multi-functional unit of claim 8, wherein the locking means comprises a vacuum lock mechanism associated with the base.

10. A multi-functional food processing, preparation and juicing unit, comprising:
    a base;
    an elongated hollow post fixed to the base and extending vertically therefrom, the post including an elongated vertical slot formed therein;
    a pressure assembly movably mounted to the post and configured to accept an upper processing adapter having a predetermined surface configuration, the pressure assembly including a rack residing within the post and having a plurality of teeth;
    a rotatable crank assembly including a gear extending into the post which engages the teeth of the rack for raising and lowering the pressure assembly, the rotatable crank assembly including a handle operably engaged with the gear such that when the handle is rotated, the gear rotates causing the rack to move parallel to the post, and the pressure assembly to move along a length of the slot in the post; and
    a holder fixed to an upper end of the base adjacent to the post and configured to accept a lower processing adapter having a surface configuration which substantially mates with the surface configuration of the upper processing adapter to perform a predetermined function when the upper processing adapter is brought towards the lower processing adapter.

11. The multi-functional unit of claim 10, wherein the upper processing adapter is removably attached to the pressure assembly.

12. The multi-functional unit of claim 10, wherein the lower processing adapter is releasably attached to the holder.

13. The multi-functional unit of claim 10, wherein the holder defines an aperture through which food processed by the multi-functional unit passes.

14. The multi-functional unit of claim 13, wherein the holder and base cooperatively define a cavity into which a container may be removably placed for the capture of processed food.

15. The multi-functional unit of claim 10, including means for locking the multi-functional unit onto a flat surface, including a vacuum lock mechanism associated with the base.

16. A multi-functional food processing, preparation and juicing unit, comprising:
    a base;
    an elongated hollow post fixed to the base and extending vertically therefrom, the post including a slot formed therein;
    a handle attached to an upper end of the post;
    a pressure assembly movably mounted to the post and configured to removably accept an upper processing adapter having a predetermined surface configuration, the pressure assembly including a rack residing within the post and having a plurality of teeth;
    a rotatable crank assembly fixed to the post and including a gear extending into the post which engages the teeth of the rack for raising and lowering the pressure assembly, the rotatable crank assembly including a handle operably engaged with the gear such that when the handle is rotated, the gear rotates causing the rack to move parallel to the post along the length of the slot; and
    a holder fixed to an upper end of the base adjacent to the post defining an aperture through which food processed by the multi-function unit passes, the holder being configured to releasably accept a lower processing adapter having a surface configuration which substantially mates with the surface configuration of the upper processing adapter to perform a predetermined food processing function when the upper processing adapter is brought towards the lower processing adapter.

17. The multi-functional unit of claim 16, wherein the holder and base cooperatively define a cavity into which a container may be removably placed for the capture of processed food.

18. The multi-functional unit of claim 16, including means for locking the multi-functional unit onto a flat surface, including a vacuum lock mechanism associated with the base.

19. A multi-functional food processing, preparation and juicing unit, comprising:
   a base;
   an elongated hollow post fixed to the base and extending vertically therefrom;
   a holder fixed to an upper end of the base adjacent to the post;
   a pressure assembly movably mounted to the post above the holder, the pressure assembly including a rack residing within the post and having a plurality of teeth;
   a rotatable crank assembly fixed to the post and including a gear extending into the post which engages the teeth of the rack for raising and lowering the pressure assembly; and
   means for removably locking the multi-functional unit onto a flat surface.

20. The multi-functional unit of claim 19, wherein the locking means comprises a vacuum lock mechanism associated with the base.

21. The multi-functional unit of claim 19, wherein the rotatable crank assembly includes a handle operably engaged with the gear such that when the handle is rotated, the gear rotates causing the rack to move parallel to the post.

22. The multi-functional unit of claim 19, wherein the pressure assembly is configured to removably accept an upper processing adapter having a predetermined surface configuration.

23. The multi-functional unit of claim 22, wherein the holder is configured to removably accept a lower processing adapter having a surface configuration which substantially mates with the surface configuration of the upper processing adapter to perform a predetermined function when the upper processing adapter is brought towards the lower processing adapter.

24. The multi-functional unit of claim 19, wherein the post includes an elongated vertical slot through which a portion of the pressure assembly extends, and over a length of which the pressure assembly moves as the handle is rotated.

* * * * *